US009298946B2

(12) United States Patent
Zhu et al.

(10) Patent No.: US 9,298,946 B2
(45) Date of Patent: Mar. 29, 2016

(54) PHYSICALLY UNCLONABLE FUNCTION BASED ON BREAKDOWN VOLTAGE OF METAL-INSULATOR-METAL DEVICE

(71) Applicant: QUALCOMM Incorporated, San Diego, CA (US)

(72) Inventors: Xiaochun Zhu, San Diego, CA (US); Steven M. Millendorf, San Diego, CA (US); Xu Guo, San Diego, CA (US); David M. Jacobson, San Diego, CA (US); Kangho Lee, San Diego, CA (US); Seung H. Kang, San Diego, CA (US); Matthew Michael Nowak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/072,735

(22) Filed: Nov. 5, 2013

(65) Prior Publication Data

US 2015/0074433 A1 Mar. 12, 2015

Related U.S. Application Data

(60) Provisional application No. 61/875,584, filed on Sep. 9, 2013.

(51) Int. Cl.

| | |
|---|---|
| *G11C 17/02* | (2006.01) |
| *G06F 21/70* | (2013.01) |
| *G06F 1/26* | (2006.01) |
| *G11C 11/16* | (2006.01) |
| *H04L 9/08* | (2006.01) |
| *H04L 9/32* | (2006.01) |
| *G09C 1/00* | (2006.01) |

(52) U.S. Cl.
CPC *G06F 21/70* (2013.01); *G06F 1/26* (2013.01); *G09C 1/00* (2013.01); *G11C 11/161* (2013.01);

(Continued)

(58) Field of Classification Search
CPC ........................................................ G11C 17/02
USPC .......................................... 365/171, 148, 158
See application file for complete search history.

(56) References Cited

U.S. PATENT DOCUMENTS

6,958,927 B1 * 10/2005 Nguyen et al. ................ 365/158
7,598,555 B1 * 10/2009 Papworth Parkin .......... 257/295

(Continued)

FOREIGN PATENT DOCUMENTS

| WO | WO-2004114122 A2 | 12/2004 |
| WO | WO-2009024913 A2 | 2/2009 |

OTHER PUBLICATIONS

International Search Report and Written Opinion—PCT/US2014/054078—ISA/EPO—Jan. 8, 2015.

*Primary Examiner* — Hoai V Ho
*Assistant Examiner* — Jay Radke
(74) *Attorney, Agent, or Firm* — Loza & Loza, LLP (57) ABSTRACT

One feature pertains to a method of implementing a physically unclonable function that includes providing an array of metal-insulator-metal (MIM) devices, where the MIM devices are configured to represent a first resistance state or a second resistance state and a plurality of the MIM devices are initially at the first resistance state. The MIM devices have a random breakdown voltage that is greater than a first voltage and less than a second voltage, where the breakdown voltage represents a voltage that causes the MIM devices to transition from the first resistance state to the second resistance state. The method further includes applying a signal line voltage to the MIM devices to cause a portion of the MIM devices to randomly breakdown and transition from the first resistance state to the second resistance state, the signal line voltage greater than the first voltage and less than the second voltage.

33 Claims, 9 Drawing Sheets

(52) U.S. Cl.
CPC ........ *G11C 11/1673* (2013.01); *G11C 11/1675* (2013.01); *G11C 11/1695* (2013.01); *G11C 17/02* (2013.01); *H04L 9/0866* (2013.01); *H04L 9/3278* (2013.01); *H04L 2209/12* (2013.01)

(56) References Cited

U.S. PATENT DOCUMENTS

| | | |
|---|---|---|
| 8,107,280 B2 | 1/2012 | Yoon et al. |
| 2011/0280065 A1* | 11/2011 | Rao et al. ................. 365/171 |
| 2011/0292714 A1* | 12/2011 | Andre et al. ................. 365/148 |
| 2012/0033490 A1 | 2/2012 | Rao et al. |
| 2012/0106235 A1* | 5/2012 | Christensen et al. ......... 365/149 |
| 2012/0155158 A1 | 6/2012 | Higo et al. |
| 2012/0230087 A1 | 9/2012 | Chellappa et al. |
| 2012/0292589 A1* | 11/2012 | Yoneda et al. ................. 257/4 |
| 2012/0319724 A1* | 12/2012 | Plusquellic et al. ............. 326/8 |
| 2013/0028011 A1 | 1/2013 | Kitagawa et al. |
| 2013/0083586 A1* | 4/2013 | Petitprez ..................... 365/102 |
| 2013/0208526 A1 | 8/2013 | Chung |
| 2014/0136583 A1* | 5/2014 | Hyde et al. ................... 708/250 |

* cited by examiner

Array with No Breakdowns

FIG. 5

$V_{0\%} < V_{SL} < V_{100\%}$ Applied

1002 — Providing an array of metal-insulator-metal (MIM) devices, the MIM devices each configured to represent one of a first resistance logical state and a second resistance logical state and at least a plurality of the MIM devices are initially at the first resistance logical state, each of the MIM devices having a random breakdown voltage $V_{BR}$ that is greater than a first voltage $V_1$ and less than a second voltage $V_2$, the breakdown voltage $V_{BR}$ representing a voltage level that causes a thin insulator layer of the MIM devices to breakdown and transition the MIM devices from the first resistance logical state to the second resistance logical state, the first resistance logical state having a greater resistance than the second resistance logical state.

1004 — Applying a signal line voltage $V_{SL}$ to each of the MIM devices to cause at least a portion of the plurality of MIM devices to randomly breakdown and transition from the first resistance logical state to the second resistance logical state, the signal line voltage $V_{SL}$ greater than the first voltage $V_1$ and less than the second voltage $V_2$.

1006 — Sending a challenge to the array of MIM devices that reads logical states of select MIM devices of the array.

1008 — Obtaining a response to the challenge from the array of MIM devices that includes the logical states of the selected MIM devices of the array.

PHYSICALLY UNCLONABLE FUNCTION BASED ON BREAKDOWN VOLTAGE OF METAL-INSULATOR-METAL DEVICE

CLAIM OF PRIORITY

The present application for patent claims priority to U.S. Provisional Patent Application No. 61/875,584 entitled "PHYSICALLY UNCLONABLE FUNCTION BASED ON BREAKDOWN VOLTAGE OF METAL-INSULATOR-METAL DEVICE" filed Sep. 9, 2013, the entire disclosure of which is hereby expressly incorporated by reference herein.

BACKGROUND

1. Field

Various features relate to physically unclonable functions (PUFs), and in particular to PUFs based on the breakdown voltages of an array of metal-insulator-metal devices, such as magnetoresistive random-access memory (MRAM) cells.

2. Background

An on-chip PUF is a chip-unique challenge-response mechanism exploiting manufacturing process variations inside integrated circuits (ICs). When a physical stimulus (i.e., challenge) is applied to the PUF, the PUF generates a response in an unpredictable but repeatable way due to the complex interaction of the stimulus with the physical microstructure of the device employing the PUF. This exact microstructure depends on physical factors introduced during manufacture of the device employing the PUF, which are unpredictable. The PUF's "unclonability" means that each device employing the PUF has a unique and unpredictable way of mapping challenges to responses, even if one device is manufactured with the same process as another seemingly identical device. Thus, it is practically infeasible to construct a PUF with the same challenge-response behavior as another device's PUF because exact control over the manufacturing process is infeasible.

Figure 1:
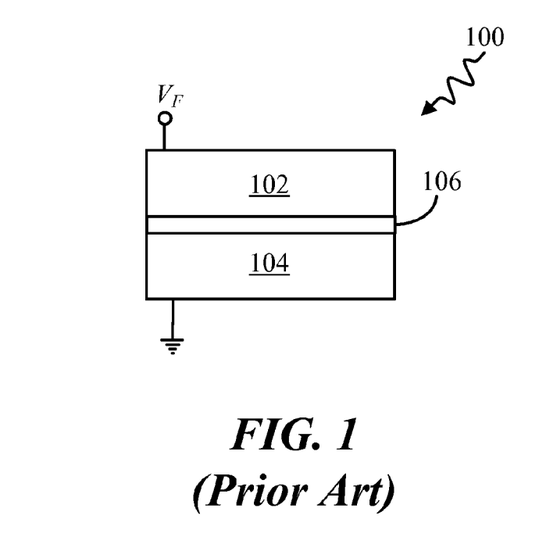
FIG. 1 illustrates a metal-insulator-metal (MIM) device found in the prior art.

FIG. 1 illustrates a metal-insulator-metal (MIM) device 100 found in the prior art. The MIM device 100 includes a first metal layer 102, a second metal layer 104, and an insulator layer 106 positioned between the first and second metal layers 102, 104. If the insulator layer 106 is thin enough and a voltage level $V_F$ applied between the first and second metal layers 102, 104 (i.e., across the insulator layer 106) exceeds a certain threshold value, then the insulator layer 106 may breakdown and conductive "pin holes" (not shown) may form within the insulator layer 106. The conductive pin holes electrically couple the first and second metal layers 102, 104 and significantly lower the resistance between the metal layers 102, 104. Typically, this breakdown and pin hole formation is irreversible. The minimum voltage level applied between the first and second metal layers 102, 104 that causes breakdown of the insulator layer 106 may be referred to herein as the breakdown voltage $V_{BR}$.

Figure 2:
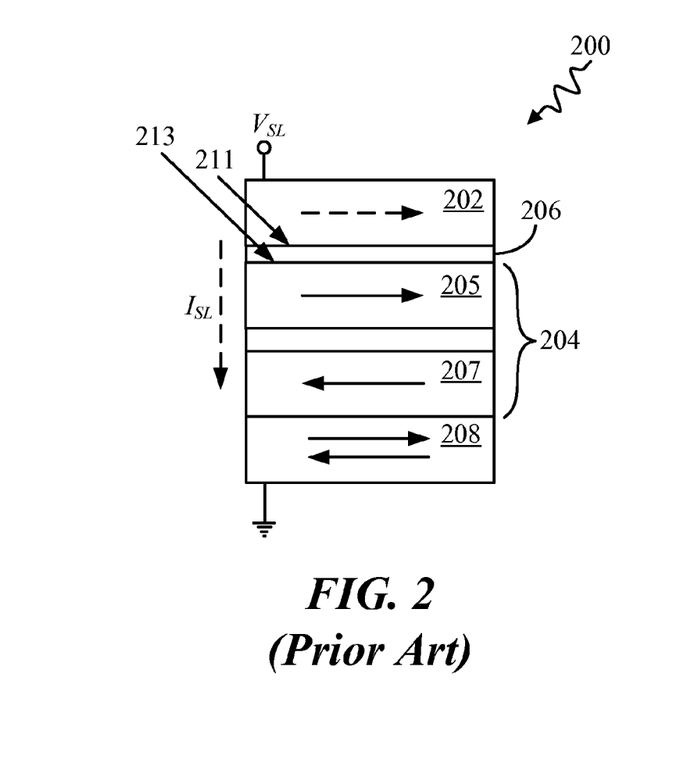
FIG. 2 illustrates a schematic diagram of at least a portion of a spin transfer torque (STT) MRAM circuit cell found in the prior art.

MRAM is a non-volatile random-access memory that, unlike conventional RAM, stores data not as electric charge but instead as electron spin within magnetic storage elements. FIG. 2 illustrates a schematic diagram of at least a portion of a spin transfer torque (STT) MRAM circuit cell 200 found in the prior art. The MRAM cell 200 includes a free layer 202, a reference layer (also known as "pinned reference layer") 204, a tunnel junction layer 206, and an anti-ferromagnetic (AFM) pinning layer 208. The free layer 202 is a ferromagnetic layer whose magnetic polarity is not fixed but is instead free to change direction in response to an external magnetic field (not shown). The reference layer 204 includes a first ferromagnetic layer 205 and a second ferromagnetic layer 207 that have opposite magnetic polarities. By contrast to the free layer 202, the reference layer 204 has a magnetic polarity that is fixed such that the magnetic polarities of the first and second ferromagnetic layers 205, 207 do not change direction in the presence of the aforementioned external magnetic field. The AFM pinning layer 208 is an anti-ferromagnetic layer that controls the magnetic polarities of the reference layer 206.

Situated in between the free layer 202 and the reference layer's first ferromagnetic layer 204 is the tunnel junction layer 206. The tunnel junction layer 206 is made of a very thin insulating material, such as magnesium oxide (MgO). The tunnel junction layer 206 is so thin that electrons may actually flow through (e.g., tunnel through) the layer 206 despite the layer 206 being an insulator. In most prior art MRAM applications the magnetic polarity direction of the free layer 202 relative to the first ferromagnetic layer 205 (e.g., parallel to each other or antiparallel to each other) represents one of two different logical data bit states (e.g. data bit "1" or data bit "0").

A signal line voltage $V_{SL}$ applied to the MRAM cell 200 controls the flow of current $I_{SL}$ through the MRAM cell 200. For example, applying a positive voltage $V_{SL}$ that exceeds the transition voltage $V_T$ of the cell 200 causes the current $I_{SL}$ to flow in the direction shown in FIG. 2 and also causes the magnetic polarity of the free layer 202 to change direction (e.g., from being parallel to the first ferromagnetic layer's 205 magnetic polarity to being antiparallel). To change the magnetic polarity direction of the free layer 202 back, a negative signal line voltage $V_{SL}$ that exceeds $V_T$ (e.g., the ground and $V_{SL}$ terminals in FIG. 2 are reversed) is applied to cause the current $I_{SL}$ to flow in the opposite direction shown in FIG. 2.

Notably, if the signal line voltage $V_{SL}$ causes the voltage differential between the two surfaces 211, 213 of the tunnel junction layer 206 to exceed a threshold voltage, then the tunnel junction layer 206 breaks down and conductive pin holes are formed within the thin insulating layer 206. The signal line voltage $V_{SL}$ that causes the tunnel junction layer 206 to breakdown may also be referred to herein as the breakdown voltage $V_{BR}$. The conductive pin holes (not shown) that pass through the thickness of the tunnel junction layer 206 cause the resistance of the tunnel junction layer 206 to significantly drop. Typically, a broken down tunnel junction layer 206 is permanent and the pin holes formed cannot be reversed/removed. The breakdown voltage $V_{BR}$ of the MRAM cell 200 should be greater than the transition voltage $V_T$ of the cell 200.

There exists a need for methods and apparatuses that implement PUFs based on metal-insulator-metal (MIM) devices having thin insulating layers, such as MRAM circuit cells. Specifically, there exists a need to implement PUFs based on the random breakdown voltage $V_{BR}$ variation among a plurality of MIMs within a MIM array, such as MRAM cells within an MRAM cell array. Such MIM and/or MRAM based PUFs may provide a secure means to uniquely identify electronic devices, such as integrated circuits, and/or provide secure cryptographic keys for cryptographic security algorithms.

SUMMARY

One feature provides for a method of implementing a physically unclonable function (PUF). The method comprises providing an array of metal-insulator-metal (MIM) devices, where the MIM devices are each configured to represent one of a first resistance logical state and a second resistance logical state and at least a plurality of the MIM devices are initially at the first resistance logical state, and each of the MIM devices have a random breakdown voltage $V_{BR}$ that is greater than a first voltage $V_1$ and less than a second voltage $V_2$, the breakdown voltage $V_{BR}$ representing a voltage level that causes a thin insulator layer of the MIM devices to breakdown and transition the MIM devices from the first resistance logical state to the second resistance logical state, the first resistance logical state having a greater resistance than the second resistance logical state, and applying a signal line voltage $V_{SL}$ to each of the MIM devices to cause at least a portion of the plurality of MIM devices to randomly breakdown and transition from the first resistance logical state to the second resistance logical state, the signal line voltage $V_{SL}$ greater than the first voltage $V_1$ and less than the second voltage $V_2$. According to one aspect, the method further comprises sending a challenge to the array of MIM devices that reads logical states of select MIM devices of the array, and obtaining a response to the challenge from the array of MIM devices that includes the logical states of the selected MIM devices of the array. According to another aspect, the array of MIM devices is an array of devices each having a magnetic tunnel junction.

According to one aspect, the array of MIM devices is an array of magnetoresistive random access memory (MRAM) circuit cells. According to another aspect, the challenge includes MRAM device address information, and the response includes data bit information of MRAM devices corresponding to the MRAM device address information. According to yet another aspect, the MRAM circuit cells lack an anti-ferromagnetic (AFM) pinning layer.

According to one aspect, the MRAM circuit cells have a reference layer that includes a single ferromagnetic layer. According to another aspect, the signal line voltage $V_{SL}$ is about equal to a voltage level $V_3$ that corresponds to a voltage level that causes about half of the MIM devices in the array to breakdown and change logical state from the first resistance logical state to the second resistance logical state. According to yet another aspect, the logical states of the MIM devices of the array after the signal line voltage $V_{SL}$ is applied are stored in secure memory.

According to one aspect, the logical states of the MIM devices of the array after the signal line voltage $V_{SL}$ is applied serve as a cryptographic key that uniquely identifies an electronic device. According to another aspect, the logical states of the MIM devices of the array after the signal line voltage $V_{SL}$ is applied are utilized by a cryptographic security algorithm.

Another feature provides an apparatus for implementing a physically unclonable function (PUF). The apparatus comprises an array of metal-insulator-metal (MIM) devices each configured to represent one of a first resistance logical state and a second resistance logical state and at least a plurality of the MIM devices are initially at the first resistance logical state, each of the MIM devices having a random breakdown voltage $V_{BR}$ that is greater than a first voltage $V_1$ and less than a second voltage $V_2$, the breakdown voltage $V_{BR}$ representing a voltage level that causes a thin insulator layer of the MIM devices to breakdown and transition the MIM devices from the first resistance logical state to the second resistance logical state, the first resistance logical state having a greater resistance than the second resistance logical state, and a processing circuit communicatively coupled to the MIM devices and configured to apply a signal line voltage $V_{SL}$ to each of the MIM devices to cause at least a portion of the plurality of MIM devices to randomly breakdown and transition from the first resistance logical state to the second resistance logical state, the signal line voltage $V_{SL}$ greater than the first voltage $V_1$ and less than the second voltage $V_2$. According to one aspect, the processing circuit is further configured to send a challenge to the array of MIM devices that reads logical states of select MIM devices of the array, and obtain a response to the challenge from the array of MIM devices that includes the logical states of the selected MIM devices of the array.

Another feature provides an apparatus for implementing a physically unclonable function (PUF), where the apparatus comprises an array of metal-insulator-metal (MIM) devices, the MIM devices each configured to represent one of a first resistance logical state and a second resistance logical state and at least a plurality of the MIM devices are initially at the first resistance logical state, each of the MIM devices having a random breakdown voltage $V_{BR}$ that is greater than a first voltage $V_1$ and less than a second voltage $V_2$, the breakdown voltage $V_{BR}$ representing a voltage level that causes a thin insulator layer of the MIM devices to breakdown and transition the MIM devices from the first resistance logical state to the second resistance logical state, the first resistance logical state having a greater resistance than the second resistance logical state, and a means for applying a signal line voltage $V_{SL}$ to each of the MIM devices to cause at least a portion of the plurality of MIM devices to randomly breakdown and transition from the first resistance logical state to the second resistance logical state, the signal line voltage $V_{SL}$ greater than the first voltage $V_1$ and less than the second voltage $V_2$. According to one aspect, the apparatus further comprises a means for sending a challenge to the array of MIM devices that reads logical states of select MIM devices of the array, and a means for obtaining a response to the challenge from the array of MIM devices that includes the logical states of the selected MIM devices of the array.

Another feature provides a computer-readable storage medium having one or more instructions stored thereon for implementing a physically unclonable function (PUF), the instructions, which when executed by at least one processor, causes the processor to apply a signal line voltage $V_{SL}$ to each of a plurality of (metal-insulator-metal) MIM devices to cause at least a portion of the plurality of MIM devices to randomly breakdown and transition from a first resistance logical state to a second resistance logical state, each of the MIM devices having a random breakdown voltage $V_{BR}$ that is greater than a first voltage $V_1$ and less than a second voltage $V_2$, the breakdown voltage $V_{BR}$ representing a voltage level that causes a thin insulator layer of the MIM devices to breakdown and transition the MIM devices from the first resistance logical state to the second resistance logical state, the signal line voltage $V_{SL}$ greater than the first voltage $V_1$ and less than the second voltage $V_2$, and the first resistance logical state having a greater resistance than the second resistance logical state. According to one aspect, the instructions, which when executed by the processor, further cause the processor to send a challenge to the array of MIM devices that reads logical states of select MIM devices of the array, and obtain a response to the challenge from the array of MIM devices that includes the logical states of the selected MIM devices of the array.

BRIEF DESCRIPTION OF DRAWINGS

FIG. 3, comprising

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

Overview

Methods and apparatuses are described herein that implement PUFs based on MIM device arrays, including MRAM circuit cell arrays. Specifically, the unique and random breakdown voltage $V_{BR}$ variation among individual MIM devices within an MIM device array, such as MRAM circuit cells of an MRAM cell array, that arise due to manufacturing process variation is utilized as the basis for implementing and executing PUFs. The responses generated by the MIM based PUFs, such as MRAM based PUFs, may be used to uniquely identify the electronic devices and/or integrated circuits having the MIM based PUFs. Alternatively, the responses generated by the PUF may be used as secure cryptographic keys for cryptographic security algorithms.

Exemplary MIM and MRAM Based PUFs and Methods for Implementing the Same

Figure 3A:
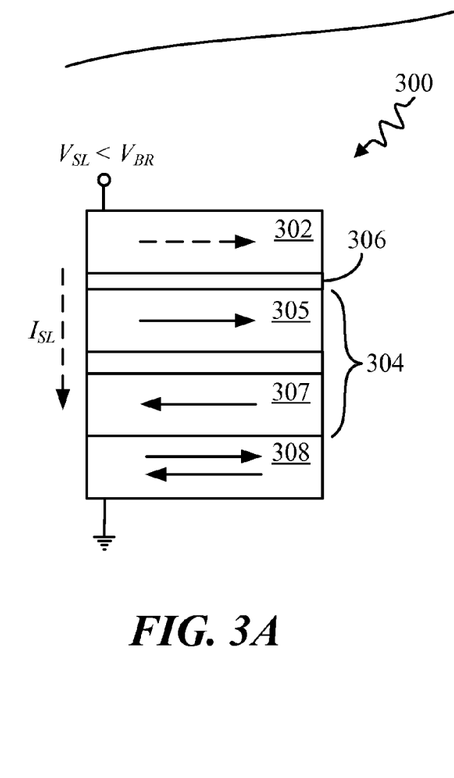
FIGS. 3A, 3B, and 3C, illustrates an STT MRAM circuit cell.
Figure 3B:
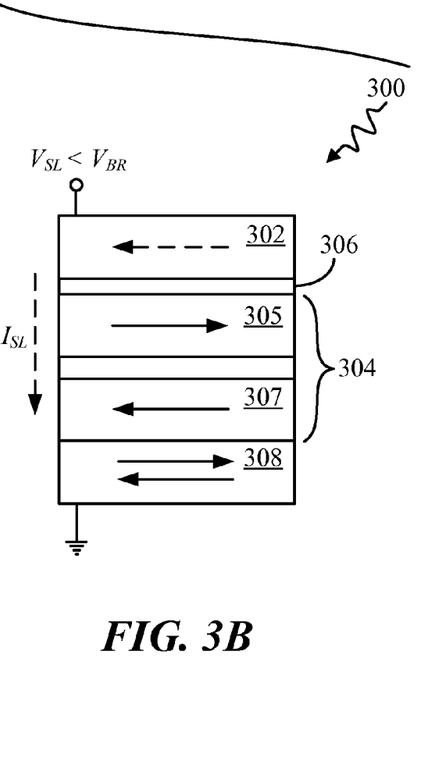
Figure 3C:
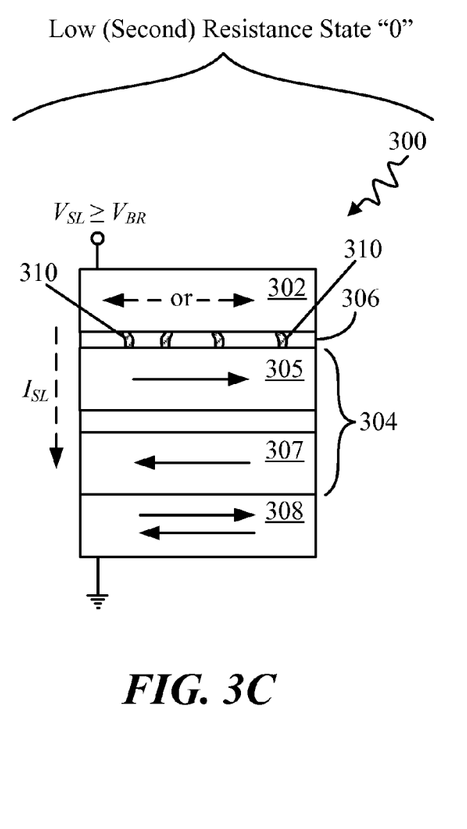

FIG. 3, comprising FIGS. 3A, 3B, and 3C, illustrates an STT MRAM circuit cell 300 according to one aspect of the disclosure. FIG. 3A illustrates the MRAM cell 300 having a "parallel orientation" where the free layer's 302 magnetic polarity is parallel to the magnetic polarity of the reference layer's 304 first ferromagnetic layer 305. FIG. 3B illustrates the MRAM cell 300 having a "antiparallel orientation" where the free layer's 302 magnetic polarity is opposite to the magnetic polarity of the reference layer's 304 first ferromagnetic layer 305. FIG. 3C illustrates the MRAM cell 300 having a broken down tunnel junction layer 306 (e.g., signal line voltage $V_{SL}$ exceeds the cell's $V_{BR}$) and conductive pin holes 310 (e.g., referred to as the "breakdown condition").

As shown in the illustrated example, the parallel and antiparallel orientation conditions of the MRAM cell 300 may be considered "high resistance states" (herein also referred to as "first resistance logical state") and be represented by a logical state "1" (i.e., data bit "1"). For instance, the MRAM cell 300 in the parallel orientation (FIG. 3A) may have a resistance between its free layer 302 and its AFM pinning layer 308 of about 2,000 ohms. As another example, the MRAM cell 300 in the antiparallel orientation (FIG. 3B) may have a resistance between its free layer 302 and its AFM pinning layer 308 of about 4,000 ohms.

By contrast, in the breakdown condition (FIG. 3C) the MRAM cell 300 may be considered a "low resistance state" (herein also referred to as "second resistance logical state") and be represented by a logical state "0" (i.e., data bit "0"). For example, the breakdown condition MRAM cell 300 may have a resistance between its free layer 302 and its AFM pinning layer 308 of only about 300 ohms.

The MRAM cell 300 may transition from either the antiparallel or parallel orientation condition to the breakdown condition by applying a signal line voltage $V_{SL}$ to the cell 300 that exceeds the breakdown voltage $V_{BR}$ of the cell 300. Such a voltage level exceeding the breakdown voltage $V_{BR}$ causes the tunnel junction layer 306 to breakdown and the conductive pin holes 310 to form. Since the resistance of the broken down MRAM cell 300 in FIG. 3C is lower, the current $I_{SL}$ through the MRAM cell 300 in FIG. 3C is higher than the current $I_{SL}$ through the MRAM cell 300 in both the antiparallel orientation and the parallel orientation (i.e., FIGS. 3A, 3B). External circuitry (not shown) may detect the amount of current $I_{SL}$ through the cells 300 of the array and determine whether a particular cell 300 is in a high resistance state or a low resistance state (i.e., whether the cell represents a "1" or a "0").

Notably, even though manufacturing processes may attempt to manufacture an array of MIM devices in an MIM array or a plurality of MRAM cells in an MRAM cell array to be identical, the breakdown voltages $V_{BR}$ of each MRAM cell in the array will not be exactly the same. Random variations during the manufacturing process of the MIM devices and MRAM circuit cells (e.g., varying semiconductor device dimensions, doping concentrations, irregularities, etc.) cause the breakdown voltages $V_{BR}$ of the devices and cells to vary, even if only slightly. For example, an array of MRAM circuit cells may include one MRAM circuit cell that has a breakdown voltage $V_{BR}$ that may be as low as 0.904 volts whereas another MRAM circuit cell in the same MRAM cell array may have a breakdown voltage $V_{BR}$ that is as high as 1.209 volts. The remaining plurality of cells within the array will have breakdown voltages $V_{BR}$ that lie within this range. Moreover, the specific breakdown voltage of any one particular MIM device or MRAM circuit cell is virtually impossible to predict and is random in nature due to the random manufacturing variations. As described herein, the random breakdown voltages of an MIM array's MIM devices and/or an MRAM array's MRAM circuit cells may be used as a basis to implement a PUF.

Figure 4:
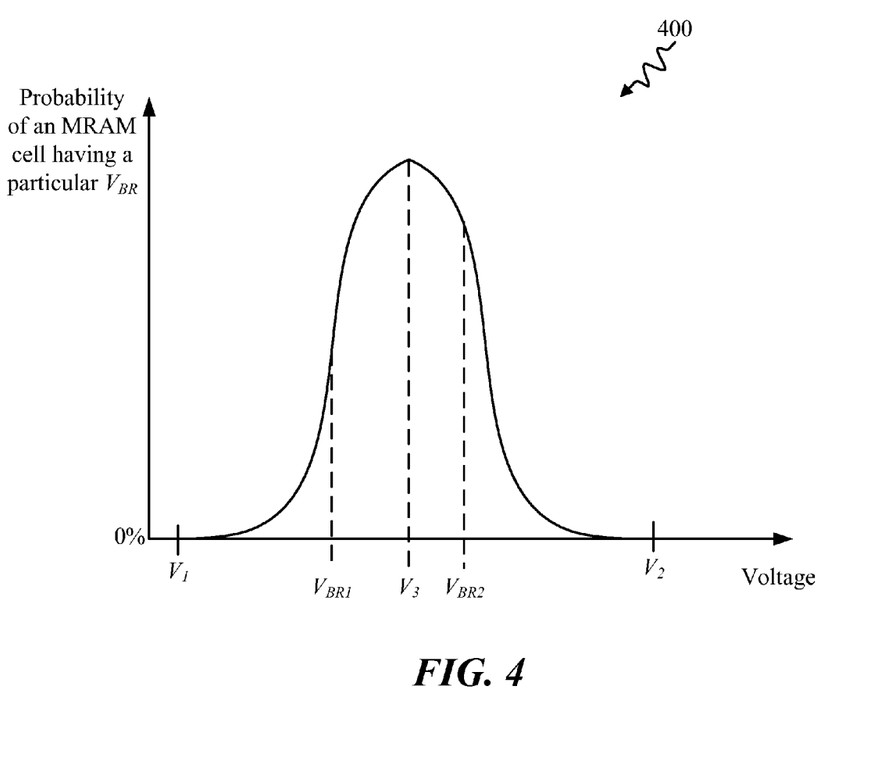
FIG. 4 illustrates a graph of the probability distribution of an MIM device, such as an MRAM circuit cell, having a breakdown voltage $V_{BR}$ that is equal to a particular voltage value.

FIG. 4 illustrates a graph 400 of the probability distribution of an MIM device, such as an MRAM circuit cell, having a breakdown voltage $V_{BR}$ that is equal to a particular voltage value according to one aspect of the disclosure. For example, the voltage level marker $V_1$ (herein also referred to as "first voltage $V_1$") represents a voltage level that is less than the breakdown voltage $V_{BR}$ of all of the MRAM cells within an MRAM cell array. Thus, with a high degree of probability (e.g., 99.99%) all of the MRAM cells in the array will likely have a breakdown voltage $V_{BR}$ that is greater than $V_1$, and hence applying $V_1$ to the signal line of the array's MRAM cells will likely cause none of the MRAM cells to breakdown (i.e., the MRAM cells will not transition from the high resistance state "1" to the low resistance state "0"). By contrast, the voltage level marker $V_2$ represents a voltage level that is greater than the breakdown voltage $V_{BR}$ of all of the MRAM cells within the array. Thus, with a high degree of probability (99.99%) applying the voltage level $V_2$ to the signal line of any MRAM cell within the array will likely result in that MRAM cell breaking down (i.e., the MRAM cell will transition from the high resistance state "1" to the low resistance state "0"). The voltage level marker $V_3$ (herein also referred to as a "third voltage $V_3$") represents the voltage level where half of the MRAM cells within the array have breakdown voltages $V_{BR}$ that are about equal to or less than the voltage level $V_3$.

As one example, the graph 400 shows a breakdown voltage $V_{BR1}$ that represents the breakdown voltage of a first MRAM cell within the MRAM cell array. In this case, the breakdown voltage $V_{BR1}$ is less than the voltage $V_3$ yet greater than the array's minimum breakdown voltage $V_1$. Thus, applying a signal line voltage $V_{SL}$ equal to or greater than the voltage $V_{BR1}$ will cause the first MRAM cell to breakdown and transition its logical state from a high resistance "1" state to a low resistance "0" state.

As another example, the graph 400 shows a breakdown voltage $V_{BR2}$ that represents the breakdown voltage of a second MRAM cell within the MRAM cell array. In this case, the breakdown voltage $V_{BR2}$ is greater than the voltage $V_3$ yet less than the array's greatest breakdown voltage $V_2$. Thus, applying a signal line voltage $V_{SL}$ equal to or greater than the voltage $V_{BR2}$ will cause the second MRAM cell to transition its logical state from a high resistance "1" state to a low resistance "0" state.

It may be observed that applying the voltage $V_{BR1}$ to the signal line of the second MRAM cell will not cause the second MRAM cell to breakdown and transition logical states since the voltage $V_{BR1}$ is less than the required breakdown voltage $V_{BR2}$ of the second MRAM cell. By contrast, applying the voltage $V_{BR2}$ to the signal line of the first MRAM cell will cause the first MRAM cell to transition logical states since the voltage $V_{BR2}$ is greater than the required breakdown voltage $V_{BR1}$ of the first MRAM cell.

Notably, applying a signal line voltage $V_{SL}$ level less than $V_2$ to an MRAM cell within the array does not guarantee that that particular MRAM cell will breakdown and transition states, since in theory it may have a breakdown voltage $V_{BR}$ that exceeds the signal line voltage $V_{SL}$ applied. Thus, applying a voltage level greater than $V_1$ yet less than $V_2$ to the signal line of all the MRAM cells in the array will cause some MRAM cells to breakdown and transition logical states while other MRAM cells in the array will not breakdown and transition logical states.

Figure 5:
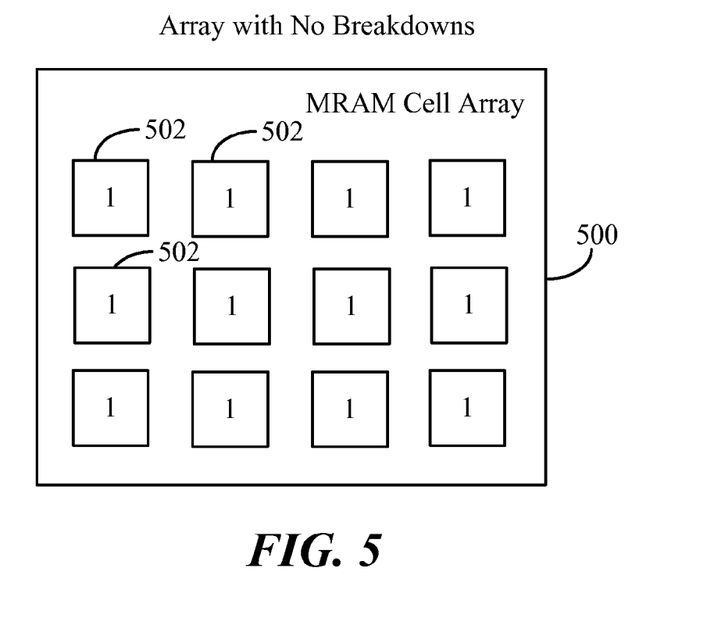
FIG. 5 illustrates an MIM array of MIM devices, such as an array of MRAM cells, where a signal line voltage $V_{SL}$ has not yet been applied that causes at least a portion of the MIM devices to breakdown and transition to the low resistance logical state.
Figure 6:
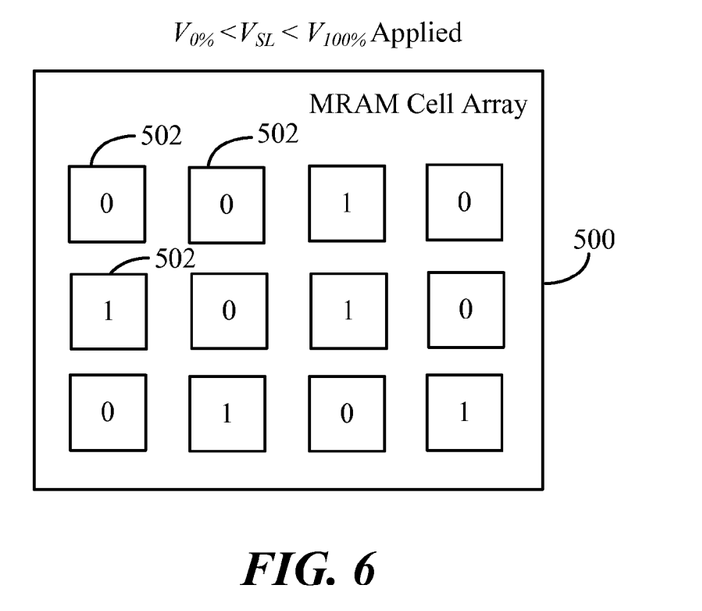
FIG. 6 illustrates an MIM array of MIM devices, such as an array of MRAM cells, where a signal line voltage $V_{SL}$ has been applied that causes at least a portion of the MIM devices to breakdown and transition to the low resistance logical state.

FIGS. 5 and 6 illustrate an MIM array 500 of MIM devices 502, such as an array of MRAM cells according to one aspect of the disclosure. Specifically, FIG. 5 illustrates a case where the array 500 is in an initial state such that none of the MRAM cells 502 in the array 500 have been broken down, and thus all are in the high resistance state (i.e., logical state "1"). (Note that it is irrelevant whether the cells 502 are in a parallel orientation (see FIG. 3A) or in an antiparallel orientation (see FIG. 3B) since both herein are considered a high resistance/logical state "1"). FIG. 6 illustrates the same array 500 after a signal line voltage $V_{SL}$ has been applied to all the MRAM cells 502 in the array 500, where the voltage $V_{SL}$ is greater than the $V_1$ voltage value yet less than the $V_2$ voltage value shown in FIG. 4. For example, the signal line voltage $V_{SL}$ applied may equal to the third voltage $V_3$ value.

Consequently a portion but not all of the cells 502 in the array 500 will breakdown and transition logical states from a "1" to a "0." Since the specific breakdown voltage $V_{BR}$ values of the individual MRAM cells 502 are random in nature, it is impossible to predict which specific MRAM cells 502 will change logical state. The resulting logical state values of the array's MRAM cells 502 represent a random outcome that is unique to that particular MRAM cell array for the signal line voltage $V_{SL}$ applied. For example, even if the same signal line voltage $V_{SL}$ is applied to another MRAM cell array that was manufactured to be the same as the array 500 depicted in FIGS. 5 and 6, the resulting logical state values of the other MRAM cell array will be different since each MRAM cell in the arrays have random and unique breakdown voltages $V_{BR}$ that differ from one array to another. That is, the specific MRAM cells of the array that breakdown and change state given the same signal line voltage $V_{SL}$ will be different across different electronic devices even though they were manufactured to be identical since they can never be exactly identical on an atomic/microscopic level.

Figure 7:
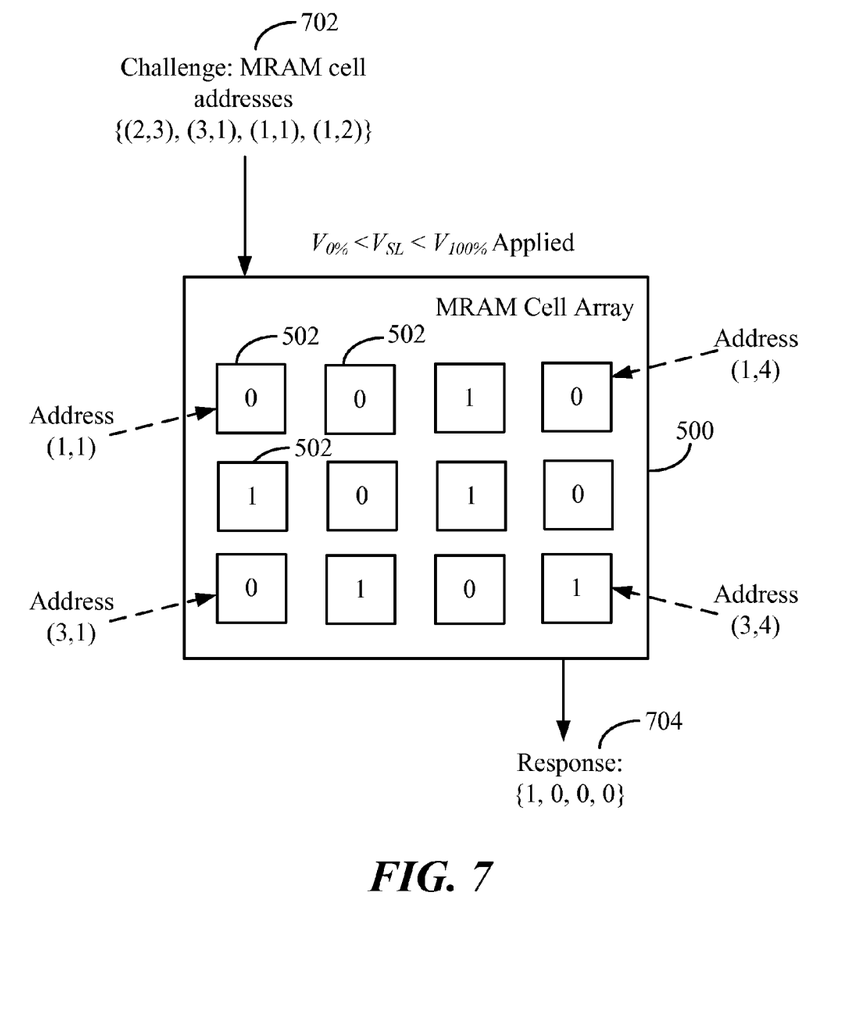
FIG. 7 illustrates an exemplary challenge-response system using the MRAM based PUF.

FIG. 7 illustrates an exemplary challenge-response system using the MRAM based PUF according to one aspect. A challenge may be received at the MRAM based PUF that includes MRAM cell address information. That is, the challenge may specify which MRAM cell address locations are to be read. In the illustrated example, a challenge 702 specifies that address locations {(2,3), (3,1), (1,1), (1,2)} of the MRAM array 500 that are to be read. The MRAM array 500 has already been supplied with a signal line voltage $V_{SL}$ that transitions some of the cells' logical states from an initial high resistance state "1" (e.g., first logical state) to a low resistance state "0" (e.g., second logical state). In response 704 to the challenge 702, the logical states of the MRAM cell address locations are read/retrieved. The resulting logical states read from the MRAM cells 502 is the response 704 to the challenge 702 issued. The resulting logical states are unique in that other MRAM cell arrays, even if attempted to be manufactured identical, will vary in their logical state responses given the same challenges (e.g., same signal line voltage $V_{SL}$ applied and same MRAM cell address location read requests) due to uncontrollable manufacturing variation.

As one example, the response 704 may be used as a cryptographic key that uniquely identifies an electronic device and/or the integrated circuit that houses the MRAM cell array 500. As another example, the response 704 may be used as a random, unique key in a cryptographic security algorithm, such as a private key in a public-private key encryption algorithm.

Figure 8:
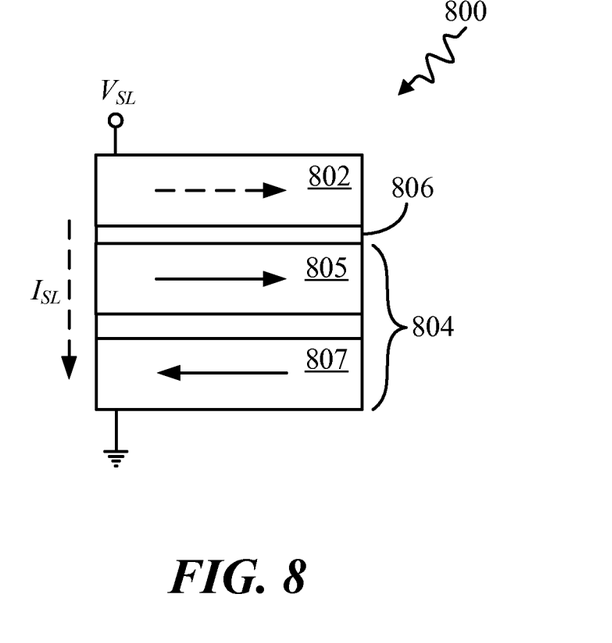
FIG. 8 illustrates a first exemplary schematic diagram of an MRAM cell.

FIG. 8 illustrates a schematic diagram of an MRAM cell 800 according to another aspect of the disclosure. The MRAM cell 800 is identical to the MRAM cell 300 of FIGS. 3A, 3B, and 3C except that the MRAM cell 800 of FIG. 8 does not have an AFM pinning layer 308 (see FIGS. 3A, 3B, 3C). Referring to FIG. 8, the MRAM cell 800 includes the free layer 802, the reference layer 804, and the tunnel junction layer 806. The reference layer 804 includes the first ferromagnetic layer 805 and the second ferromagnetic layer 807.

Since the MRAM cell 800 lacks the AFM pinning layer, the magnetic polarities of the first and second ferromagnetic layers 805, 807—although always opposite each other—may not be set to one particular orientation (i.e., they may point either left or right in FIG. 8). The magnetic polarity of the free layer 802 may still be antiparallel or parallel to the magnetic polarity of the first ferromagnetic layer 805 though despite the missing AFM pinning layer. Removing the AFM pinning layer may help reduce costs and simplify manufacturing. The MRAM cell 800 may be used in the same way as the MRAM cells described in FIGS. 3A, 3B, 3C, 4, 5, 6, and 7.

Figure 9:
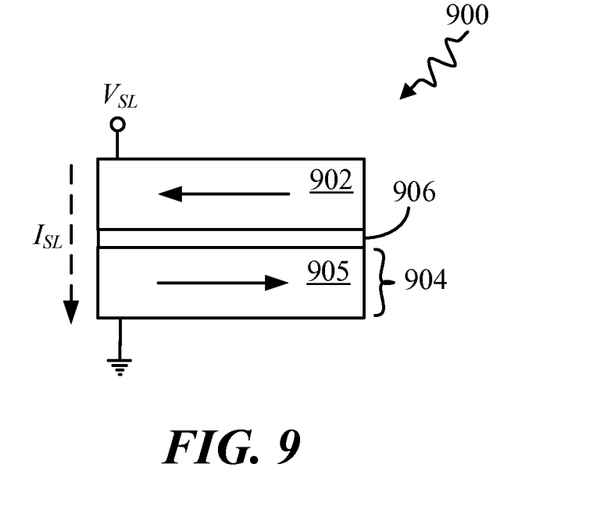
FIG. 9 illustrates a second exemplary schematic diagram of an MRAM cell.

FIG. 9 illustrates a schematic diagram of an MRAM cell 900 according to another aspect of the disclosure. The MRAM cell 900 is identical to the MRAM cell 300 of FIGS. 3A, 3B, and 3C except that the MRAM cell 900 of FIG. 8 does not have an AFM pinning layer 308 (see FIGS. 3A, 3B, 3C) or a second ferromagnetic layer 307. Referring to FIG. 9, the MRAM cell 900 includes the free layer 902, the reference layer 904, and the tunnel junction layer 906. The reference layer 904 merely includes the first ferromagnetic layer 905 and does not include a second ferromagnetic layer. Since the reference layer 904 includes only a single layer, the free layer 902 and the first reference layer 905 will always have opposite (i.e., antiparallel) magnetic polarities. Removing the AFM pinning layer and the second ferromagnetic layer may help reduce costs and simplify manufacturing. The MRAM cell 900 may be used in the same way as the MRAM cells described in FIGS. 3B, 3C, 4, 5, 6, and 7.

Figure 10:
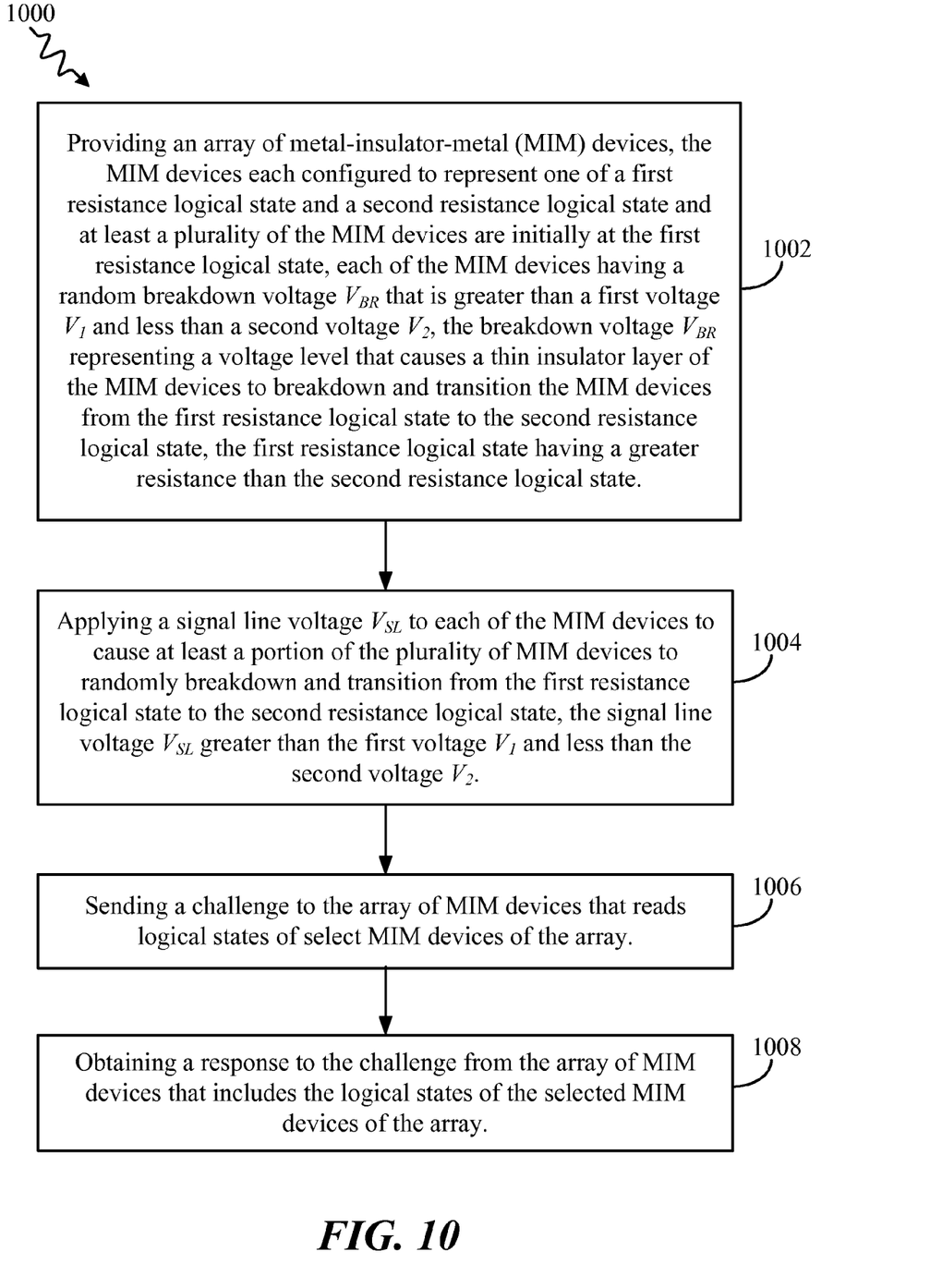
FIG. 10 illustrates a flow diagram of a method for implementing an MIM based PUF.

FIG. 10 illustrates a flow diagram 1000 of a method for implementing an MIM based PUF according to one aspect. First, an array of metal-insulator-metal (MIM) devices is provided, where the MIM devices are each configured to represent one of a first resistance logical state and a second resistance logical state and at least a plurality of the MIM devices are initially at the first resistance logical state 1002. Moreover, each of the MIM devices have a random breakdown voltage $V_{BR}$ that is greater than a first voltage $V_1$ and less than a second voltage $V_2$, and the breakdown voltage $V_{BR}$ represents a voltage level that causes a thin insulator layer of the MIM devices to breakdown and transition the MIM devices from the first resistance logical state to the second resistance logical state. The first resistance logical state also has a greater resistance than the second resistance logical state. Next, a signal line voltage $V_{SL}$ is applied to each of the MIM devices to cause at least a portion of the plurality of MIM devices to randomly breakdown and transition from the first resistance logical state to the second resistance logical state, where the signal line voltage $V_{SL}$ is greater than the first voltage $V_1$ and less than the second voltage $V_2$ 1004. Then, a challenge is sent to the array of MIM devices that reads logical states of select MIM devices of the array 1006. Next, a response to the challenge is obtained from the array of MIM devices that includes the logical states of the selected MIM devices of the array 1008.

Exemplary Electronic Device

Figure 11:
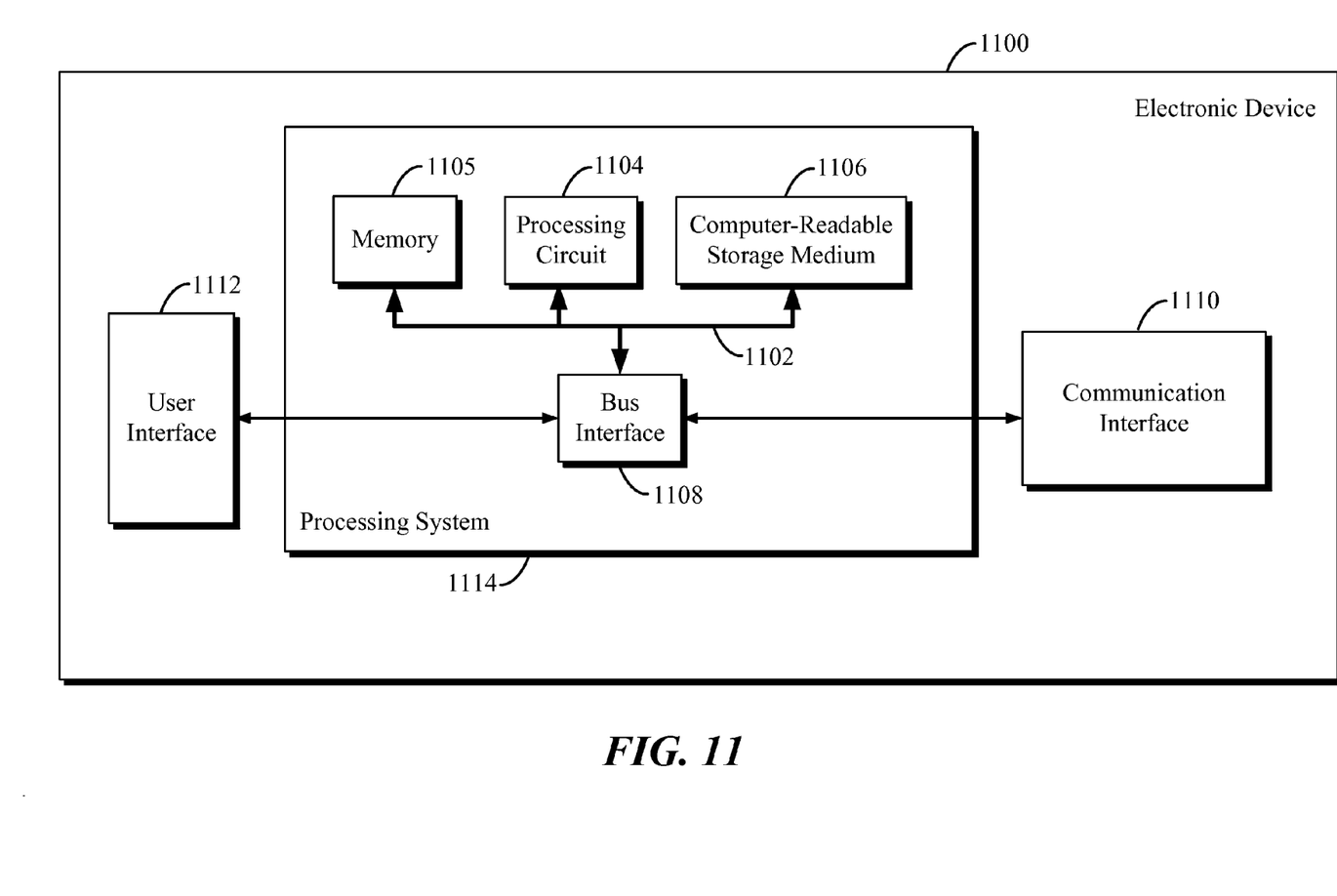
FIG. 11 illustrates an exemplary schematic block diagram of a hardware implementation for an electronic device that includes MRAM based PUFs.

FIG. 11 illustrates an exemplary schematic block diagram of a hardware implementation for an electronic device 1100 that may include the MRAM based PUFs described herein. The electronic device 1100 may be a mobile phone, smartphone, tablet, portable computer, and or any other electronic device having circuitry. The electronic device 1100 may include a communication interface 1110, a user interface 1112, and a processing system 1114. The processing system 1114 may include a processing circuit (e.g., processor) 1104, a memory circuit (e.g., memory) 1105, a computer-readable storage medium 1106, a bus interface 1108, and a bus 1102. The processing system 1114 and/or the processing circuit 1104 may be configured to perform any of the steps, functions, and/or processes described above and also those steps depicted in FIG. 10.

The processing circuit 1104 may be one or more processors (e.g., first processor, etc.) that are adapted to process data for the electronic device 1100. For example, the processing circuit 1104 may be a specialized processor, such as an application specific integrated circuit (ASIC) that serves as a means for carrying out any one of the steps described in FIG. 10 and other figures described herein including FIGS. 4-7.

Examples of processing circuits 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1104 is also responsible for managing the bus 1102, and executing software stored on the computer-readable storage medium 1106 and/or memory 1105. The software, when executed by the processing circuit 1104, causes the processing system 1114 to perform the various functions, steps, and/or processes described above with respect to FIG. 9 and other figures described herein including FIGS. 4-7. The computer-readable storage medium 1106 may be used for storing data that is manipulated by the processing circuit 1104 when executing software.

The memory circuit 1105 may be non-volatile memory, such as but not limited to FLASH memory, magnetic or optical hard disk drives, etc. The memory circuit 1105 may include the MRAM arrays described herein that are used PUFs. For example, a portion of the memory circuit 1105 may be any one of the MRAM based PUFs depicted in FIGS. 5, 6, and/or 7.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1106. The computer-readable storage medium 1106 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1106 may reside in the processing system 1114, external to the processing system 1114, or distributed across multiple entities including the processing system 1114. The computer-readable storage medium 1106 may be embodied in a computer program product.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable storage medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and the communication interface 1110 (if present). The communication interface 1110 provides a means for communicating with other apparatus over a transmission medium. Depending upon the nature of the apparatus, a user interface 1112 (e.g., keypad, display, speaker, microphone, touch-screen display, etc.) may also be provided for the electronic device 1100.

Figure 12:
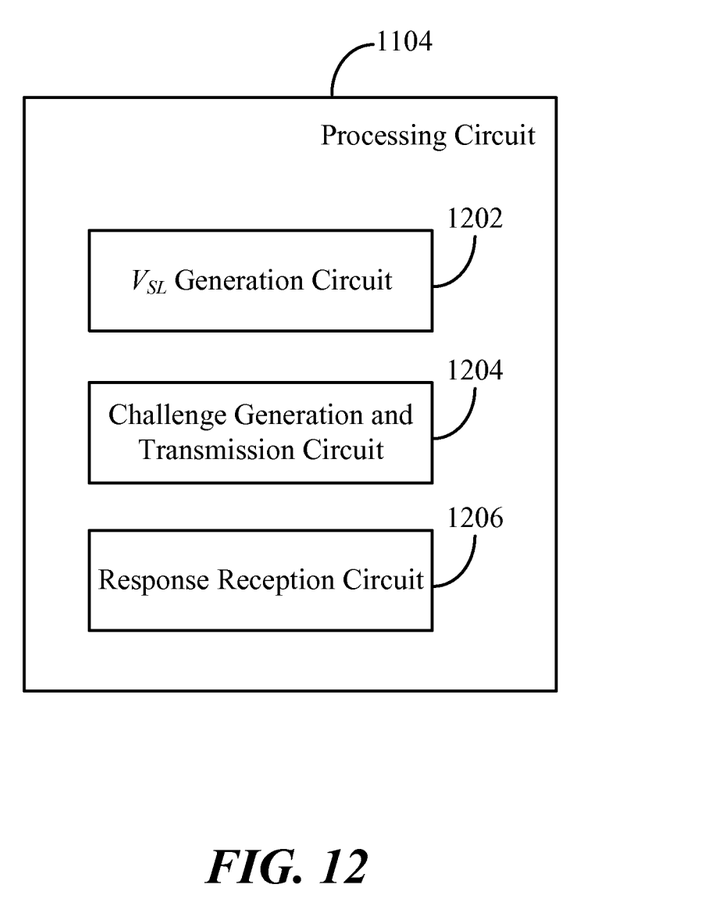
FIG. 12 illustrates a schematic block diagram of a processing circuit of an electronic device that includes MRAM based PUFs.

FIG. 12 illustrates a schematic block diagram of the processing circuit 1104 according to one aspect of the disclosure. The processing circuit 1104 may include a signal line voltage $V_{SL}$ generation circuit 1202, a challenge generation and transmission circuit 1204, and a response reception circuit 1206. According to one example, the circuits 1202, 1204, and 1206 may be communicatively coupled to one another through, for example, a bus architecture or through direct electrical wire coupling.

The signal line voltage $V_{SL}$ generation circuit 1202 may be, according to one example, a hard wired ASIC that is capable of applying a signal line voltage $V_{SL}$ to each of the MIM devices to cause at least a portion of the plurality of MIM devices to randomly breakdown and transition from the first resistance logical state to the second resistance logical state. Thus, the signal line voltage $V_{SL}$ generation circuit 1202 represents at least one means for applying a signal line voltage $V_{SL}$ to each of the MIM devices to cause at least a portion of the plurality of MIM devices to randomly breakdown and transition from the first resistance logical state to the second resistance logical state.

The challenge generation and transmission circuit 1204 may be, according to one example, a hard wired ASIC that is capable of generating and sending a challenge to an array of MIM devices that reads logical states of select MIM devices of the array. Thus, the challenge generation and transmission circuit 1204 represents at least one example of a means for sending a challenge to an array of MIM devices that reads logical states of select MIM devices of the array.

The response reception circuit 1206 may be, according to one example, a hard wired ASIC that is capable of obtaining a response to the challenge from an array of MIM devices that includes the logical states of the selected MIM devices of the array. Thus, the response reception circuit 1206 represents at least one example of a means for obtaining a response to the challenge from an array of MIM devices that includes the logical states of the selected MIM devices of the array.

One or more of the components, steps, features, and/or functions illustrated in FIGS. 3A, 3B, 3C, 4, 5, 6, 7, 8, 9, 10, 11 and/or 12 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 3A, 3B, 3C, 5, 6, 7, 8, 9, 11, and/or 12 may be configured to perform one or more of the methods, features, or steps described in FIGS. 4, 5, 6, 7, and/or 10. The algorithms described herein may also be efficiently implemented in software and/or embedded in hardware.

Moreover, in one aspect of the disclosure, the processing circuit 1104 illustrated in FIGS. 11 and 12 may be a specialized processor (e.g., an application specific integrated circuit (e.g., ASIC)) that is specifically designed and/or hard-wired to perform the algorithms, methods, and/or steps described in FIGS. 4, 5, 6, 7, and/or 10. Thus, such a specialized processor (e.g., ASIC) may be one example of a means for executing the algorithms, methods, and/or steps described in FIGS. 4, 5, 6, 7, and/or 10. The computer-readable storage medium 1106 may also store processor 1104 readable instructions that when executed by a specialized processor (e.g., ASIC) causes the specialized processor to perform the algorithms, methods, and/or steps described in FIGS. 4, 5, 6, 7, and/or 10.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of implementing a physically unclonable function (PUF), the method comprising:
   providing an array of metal-insulator-metal (MIM) devices each having a tunnel junction layer, the MIM devices each configured to represent one of a first resistance logical state or a second resistance logical state and at least a plurality of the MIM devices are initially at the first resistance logical state, each of the MIM devices having a random breakdown voltage $V_{BR}$ that is greater than a first voltage $V_1$ and less than a second voltage $V_2$, the breakdown voltage $V_{BR}$ representing a voltage level that causes the tunnel junction layer of a respective MIM device to breakdown and transition the respective MIM device from the first resistance logical state to the second resistance logical state, the first resistance logical state having a greater resistance than the second resistance logical state, and wherein the breakdown voltage $V_{BR}$ of any particular MIM device within the array depends on random manufacturing variations in doping concentrations; and
   applying a signal line voltage $V_{SL}$ to each of the MIM devices to cause the tunnel junction layers within at least a portion of the plurality of MIM devices to randomly breakdown based on the random manufacturing variations in doping concentrations and transition from the first resistance logical state to the second resistance logical state, the signal line voltage $V_{SL}$, greater than the first voltage $V_1$ and less than the second voltage $V_2$.

2. The method of claim 1, further comprising:
   sending a challenge to the array of MIM devices that reads logical states of select MIM devices of the array; and
   obtaining a response to the challenge from the array of MIM devices that includes the logical states of the selected MIM devices of the array.

3. The method of claim 2, wherein the array of MIM devices is an array of magnetoresistive random access memory (MRAM) circuit cells.

4. The method of claim 3, wherein the challenge includes MRAM device address information, and the response includes data bit information of MRAM devices corresponding to the MRAM device address information.

5. The method of claim 3, wherein the MRAM circuit cells lack an anti-ferromagnetic (AFM) pinning layer.

6. The method of claim 5, wherein the MRAM circuit cells have a reference layer that includes a single ferromagnetic layer.

7. The method of claim 1, wherein the signal line voltage $V_{SL}$, is about equal to a voltage level $V_3$ that corresponds to a voltage level that causes about half of the MIM devices in the array to breakdown and change logical state from the first resistance logical state to the second resistance logical state.

8. The method of claim 1, wherein the logical states of the MIM devices of the array after the signal line voltage $V_{SL}$ is applied are stored in secure memory.

9. The method of claim 1, wherein the logical states of the MIM devices of the array after the signal line voltage $V_{SL}$ is applied serve as a cryptographic key that uniquely identifies an electronic device.

10. The method of claim 1, wherein the logical states of the MIM devices of the array after the signal line voltage $V_{SL}$, is applied are utilized by a cryptographic security algorithm.

11. The method of claim 1, wherein applying a signal line voltage $V_{SL}$ to each of the MIM devices to cause the tunnel junction layers within at least a portion of the plurality of MIM devices to randomly breakdown is performed to cause the tunnel junction layers to breakdown due to other variations on an atomic level in addition to the variations in doping concentrations.

12. The method of claim 1, wherein each tunnel junction layer is flat and excludes any macroscopic deformations.

13. The method of claim 1, wherein the breakdown voltage of any particular MIM device within the array depends on random manufacturing variations in the tunnel junction layer of the particular MIM device that are distinct from manufacturing variations in other layers of the MIM and wherein the signal line voltage is applied to cause the tunnel junction layers to randomly breakdown based on the random manufacturing variations in the tunnel junction layers that are distinct from manufacturing variations in other layers of the MIM.

14. The method of claim 1, wherein the breakdown voltage of any particular MIM device within the array depends on random manufacturing variations in the tunnel junction layer of the particular MIM device that are not caused by manufacturing variations in other layers of the MIM and wherein the signal line voltage is applied to cause the tunnel junction layers to randomly breakdown based on the random manufacturing variations in the tunnel junction layers that are not caused by manufacturing variations in other layers of the MIM.

15. An apparatus for implementing a physically unclonable function (PUF), the apparatus comprising:
- an array of metal-insulator-metal (MIM) devices each having a tunnel junction layer and each configured to represent one of a first resistance logical state or a second resistance logical state and at least a plurality of the MIM devices are initially at the first resistance logical state, each of the MIM devices having a random breakdown voltage $V_{BR}$ that is greater than a first voltage $V_1$ and less than a second voltage $V_2$, the breakdown voltage $V_{BR}$ representing a voltage level that causes the tunnel junction layer of a respective MIM device to breakdown and transition the respective MIM device from the first resistance logical state to the second resistance logical state, the first resistance logical state having a greater resistance than the second resistance logical state, and wherein the breakdown voltage $V_{BR}$ of any particular MIM device within the array depends on random manufacturing variations in doping concentrations; and
- a processing circuit communicatively coupled to the MIM devices and configured to apply a signal line voltage $V_{SL}$ to each of the MIM devices to cause the tunnel junction layers within at least a portion of the plurality of MIM devices to randomly breakdown based on the random manufacturing variations in doping concentrations and transition from the first resistance logical state to the second resistance logical state, the signal line voltage $V_{SL}$ greater than the first voltage $V_1$ and less than the second voltage $V_2$.

16. The apparatus of claim 15, wherein the processing circuit is further configured to:
- send a challenge to the array of MIM devices that reads logical states of select MIM devices of the array; and
- obtain a response to the challenge from the array of MIM devices that includes the logical states of the selected MIM devices of the array.

17. The apparatus of claim 16, wherein the array of MIM devices is an array of magnetoresistive random access memory (MRAM) circuit cells.

18. The apparatus of claim 17, wherein the challenge includes MRAM device address information, and the response includes data bit information of MRAM devices corresponding to the MRAM device address information.

19. The apparatus of claim 17, wherein the MRAM circuit cells lack an anti-ferromagnetic (AFM) pinning layer.

20. The apparatus of claim 19, wherein the MRAM circuit cells have a reference layer that includes a single ferromagnetic layer.

21. The apparatus of claim 15, wherein the signal line voltage $V_{SL}$ is about equal to a voltage level $V_3$ that corresponds to a voltage level that causes about half of the MIM devices in the array to breakdown and change logical state from the first resistance logical state to the second resistance logical state.

22. The apparatus of claim 15, wherein the logical states of the MIM devices of the array after the signal line voltage $V_{SL}$ is applied serve as a cryptographic key that uniquely identifies an electronic device.

23. The apparatus of claim 22, wherein the logical states of the MIM devices of the array after the signal line voltage $V_{SL}$ is applied are utilized by a cryptographic security algorithm.

24. An apparatus for implementing a physically unclonable function (PUF), the apparatus comprising:
- an array of metal-insulator-metal (MIM) devices each having a tunnel junction layer, the MIM devices each configured to represent one of a first resistance logical state or a second resistance logical state and at least a plurality of the MIM devices are initially at the first resistance logical state, each of the MIM devices having a random breakdown voltage $V_{BR}$ that is greater than a first voltage $V_1$ and less than a second voltage $V_2$, the breakdown voltage $V_{BR}$ representing a voltage level that causes the tunnel junction layer of a respective MIM device to breakdown and transition the respective MIM device from the first resistance logical state to the second resistance logical state, the first resistance logical state having a greater resistance than the second resistance logical state, and wherein the breakdown voltage $V_{BR}$ of any particular MIM device within the array depends on random manufacturing variations in doping concentrations; and
- means for applying a signal line voltage $V_{SL}$ to each of the MIM devices to cause the tunnel junction layers within at least a portion of the plurality of MIM devices to randomly breakdown based on the random manufacturing variations in doping concentrations and transition from the first resistance logical state to the second resistance logical state, the signal line voltage $V_{SL}$ greater than the first voltage $V_1$ and less than the second voltage $V_2$.

25. The apparatus of claim 24, further comprising:
- means for sending a challenge to the array of MIM devices that reads logical states of select MIM devices of the array; and
- means for obtaining a response to the challenge from the array of MIM devices that includes the logical states of the selected MIM devices of the array.

26. The apparatus of claim 24, wherein the array of MIM devices is an array of magnetoresistive random access memory (MRAM) circuit cells.

27. The apparatus of claim 26, wherein the MRAM circuit cells lack an anti ferromagnetic (AFM) pinning layer.

28. The apparatus of claim 27, wherein the MRAM circuit cells have a reference layer that includes a single ferromagnetic layer.

29. A non-transitory computer-readable storage medium having one or more instructions stored thereon for implementing a physically unclonable function (PUF), the instructions, which when executed by at least one processor, causes the processor to:
- apply a signal line voltage $V_{SL}$, to each of a plurality of metal-insulator-metal (MIM) devices each having a tunnel junction layer to cause an unpredictable portion of the plurality of MIM devices to randomly breakdown and transition from a first resistance logical state to a second resistance logical state due to random manufacturing variations in doping concentrations, each of the MIM devices having a random breakdown voltage $V_{BR}$ that is greater than a first voltage $V_1$ and less than a second voltage $V_2$, the breakdown voltage $V_{BR}$ representing a voltage level that causes the tunnel junction layer of a respective MIM device to breakdown and transition the respective MIM device from the first resistance logical state to the second resistance logical state, the signal line voltage $V_{SL}$ greater than the first voltage $V_1$ and less than the second voltage $V_2$, and the first resistance logical state having a greater resistance than the second resistance logical state, and wherein the breakdown voltage $V_{BR}$ of any particular MIM device within the array depends on the random manufacturing variations in doping concentrations.

30. The non-transitory computer-readable storage medium of claim 29, wherein the instructions, which when executed by the processor, further cause the processor to:
send a challenge to the array of MIM devices that reads logical states of select MIM devices of the array; and
obtain a response to the challenge from the array of MIM devices that includes the logical states of the selected MIM devices of the array.

31. The non-transitory computer-readable storage medium of claim 29, wherein the array of MIM devices is an array of magnetoresistive random access memory (MRAM) circuit cells.

32. The non-transitory computer-readable storage medium of claim 31, wherein the MRAM circuit cells lack an anti-ferromagnetic (AFM) pinning layer.

33. The non-transitory computer-readable storage medium of claim 29, wherein the logical states of the MIM devices of the array after the signal line voltage $V_{SL}$ is applied serve as a cryptographic key that uniquely identifies an electronic device.

* * * * *